US009002974B1

(12) United States Patent
Dhanoa et al.

(10) Patent No.: US 9,002,974 B1
(45) Date of Patent: Apr. 7, 2015

(54) SCRIPT SERVER FOR EFFICIENTLY PROVIDING MULTIMEDIA SERVICES IN A MULTIMEDIA SYSTEM

(75) Inventors: Shingara Singh Dhanoa, Overland Park, KS (US); Thomas Lee Paterik, Kansas City, MO (US); Monika Kishor Panpaliya, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2065 days.

(21) Appl. No.: 11/873,178

(22) Filed: Oct. 16, 2007

(51) Int. Cl.
G06F 15/16 (2006.01)
H04N 21/222 (2011.01)
H04N 21/234 (2011.01)

(52) U.S. Cl.
CPC ........... *H04N 21/234* (2013.01); *H04N 21/222* (2013.01)

(58) Field of Classification Search
CPC .............. H04N 21/222; H04N 21/234; H04N 21/2343; H04N 21/234309
USPC .......... 709/223, 225, 227, 231, 217; 370/352, 370/356, 395.52; 715/500.1, 513, 714; 379/88.17; 707/10
See application file for complete search history.

(56) References Cited

U.S. PATENT DOCUMENTS

| | | | | |
|---|---|---|---|---|
| 6,226,672 B1* | 5/2001 | DeMartin et al. | ............. | 709/219 |
| 6,615,279 B1* | 9/2003 | Robinson | .............. | 719/315 |
| 7,149,287 B1* | 12/2006 | Burger et al. | ............. | 379/88.17 |
| 7,656,866 B2* | 2/2010 | Banner et al. | ................. | 370/356 |
| 7,774,821 B2* | 8/2010 | Dunn et al. | .................... | 725/151 |
| 7,975,019 B1* | 7/2011 | Green et al. | ................. | 709/217 |
| 7,975,020 B1* | 7/2011 | Green et al. | ................. | 709/217 |
| 2002/0120729 A1* | 8/2002 | Faccin et al. | .................. | 709/223 |
| 2003/0051037 A1* | 3/2003 | Sundaram et al. | ........... | 709/227 |
| 2003/0054879 A1* | 3/2003 | Schneier et al. | ................ | 463/29 |
| 2003/0083882 A1* | 5/2003 | Schemers, III et al. | ..... | 704/270.1 |
| 2003/0093507 A1* | 5/2003 | Shapiro | ......................... | 709/222 |
| 2003/0182424 A1* | 9/2003 | Odendahl | ..................... | 709/225 |
| 2005/0108026 A1* | 5/2005 | Brierre et al. | ..................... | 705/1 |
| 2005/0135383 A1* | 6/2005 | Shenefiel | ................. | 370/395.52 |
| 2005/0193332 A1* | 9/2005 | Dodrill et al. | ................. | 715/513 |
| 2006/0239257 A1* | 10/2006 | Banner et al. | ................. | 370/356 |
| 2006/0277454 A1* | 12/2006 | Chen | ......................... | 715/500.1 |
| 2006/0287931 A1* | 12/2006 | Brown | ......................... | 705/26 |
| 2007/0053346 A1* | 3/2007 | Bettis et al. | .................... | 370/352 |
| 2008/0141130 A1* | 6/2008 | Moore et al. | .................. | 715/714 |
| 2008/0181202 A1* | 7/2008 | O'Brien et al. | ............... | 370/352 |
| 2008/0192736 A1* | 8/2008 | Jabri et al. | ..................... | 370/352 |
| 2008/0284910 A1* | 11/2008 | Erskine et al. | ................ | 348/468 |
| 2008/0307108 A1* | 12/2008 | Yan et al. | ....................... | 709/231 |
| 2009/0119303 A1* | 5/2009 | Rio et al. | ......................... | 707/10 |
| 2009/0327895 A1* | 12/2009 | Bailloux et al. | .............. | 715/730 |
| 2010/0257569 A1* | 10/2010 | O'Hanlon | ..................... | 725/110 |
| 2013/0047074 A1* | 2/2013 | Vestergaard et al. | ......... | 715/234 |

* cited by examiner

*Primary Examiner* — Imad Hussain

(57) ABSTRACT

A method, system, and medium are provided for efficiently providing multimedia services from a multimedia system. A script server is included with the multimedia system to host common scripts for invoking media-related functions from media servers. When an application server within the multimedia system runs an application and determines a media-related function is required, a script for the required media-related function is accessed from the script server. The script is run to invoke the media-related function from a media server.

18 Claims, 3 Drawing Sheets

SCRIPT SERVER FOR EFFICIENTLY PROVIDING MULTIMEDIA SERVICES IN A MULTIMEDIA SYSTEM

BACKGROUND

With the widespread deployment of broadband wireless technologies, there has been greater interest from consumers to use their mobile devices for a variety of multimedia services, such as, for instance, video conference, video chat, video games, and the like. These multimedia services are typically provided from a multimedia system architecture that includes application servers hosting multimedia applications for providing the variety of multimedia services.

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide systems, methods, and computer-readable media for, among other things, efficiently providing multimedia services from multimedia systems employing application servers hosting multimedia applications and media servers providing media-related functions for the multimedia applications. Embodiments of the present invention have several practical applications in the technical arts including, but not limited to, providing efficiency within multimedia system architectures by reducing redundancy in such systems. In particular, embodiments of the present invention provide a multimedia system architecture in which a script server provides common scripts for invoking media-related functions.

Accordingly, in one aspect, an embodiment of the invention is directed to one or more computer-readable media embodying computer-useable instructions for performing a method. The method includes running a multimedia application at an application server within a multimedia system, wherein the multimedia system includes a plurality of application servers. The method also includes determining a media-related function is needed from a media server. The method further includes accessing, from a script server, a script corresponding with the media-related function and running the script. The method still further includes performing the media-related function at the media server in accordance with the script.

In another aspect of the invention, an embodiment is directed to a multimedia system for providing multimedia services. The multimedia system includes a number of application servers, one or more media servers, and one or more script servers. The application servers host and run multimedia applications. At least a portion of the multimedia applications, when run, require media-related functions to be performed. The media servers perform media-related functions when required by multimedia applications. The script servers store a number of scripts, wherein each script is for invoking a media-related function when required by a multimedia application.

A further embodiment of the invention is directed to a script server within a multimedia system. The script server includes a database of scripts, wherein each script is for invoking one of a number of media-related functions. The script server also includes one or more computer-readable media embodying instructions for performing a method that includes receiving a message from an application server running a multimedia application and requiring a media-related function. The method also includes accessing a script corresponding with the media-related function in response to the message from the application server. The method further includes running the script to cause a media server to provide the media-related function.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
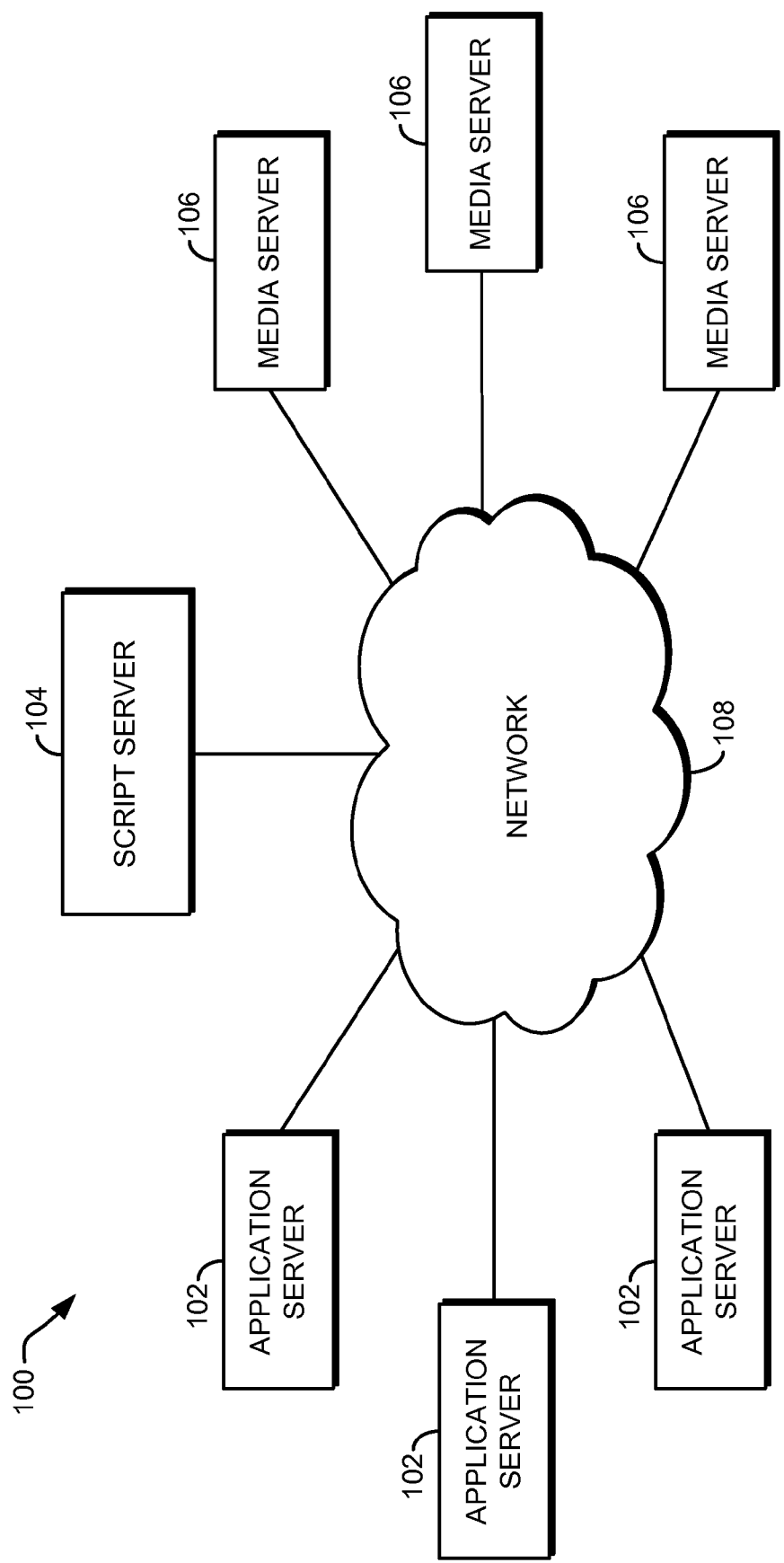
FIG. 1 is a block diagram of an exemplary system architecture suitable for use in implementing an embodiment of the present invention.

As indicated previously, there has been increased user interest in using mobile devices for multimedia services, such as, for instance, video conferencing, video chat, and video games. To provide such multimedia services to mobile devices, a multimedia system architecture, such as the IP Multimedia Subsystem (IMS), for instance, is employed for service delivery and management. Among other components, such multimedia system architectures generally include application servers which serve to host and execute multimedia service applications. Historically, each type of multimedia service is hosted by a separate application server, although in some cases an application server may host more than one multimedia service application. For instance, a multimedia system architecture may include a video conferencing application server, a video sharing application server, and a video game application server. Each application sever contains the application logic necessary to provide the specific type of multimedia service for which the application server is intended.

When providing media services, application servers typically require media-related functions to be provided by a media server, a separate component within the multimedia system architecture. Generally, the application server acts as a controller instructing the media server to perform a variety of media-related functions. The media server acts as a processor to implement the media-related functions. For instance, the media server may provide media manipulation (e.g., video mixing), play tones, provide announcements, provide transcoding, add text to a video, and the like.

Embodiments of the present invention are derived from the recognition of redundancy in current multimedia system architectures and the possibility of more efficiently providing media services. In today's environment, media scripts which run on the media server are stored in each application server. These scripts are retrieved from the application servers when there is need to run the scripts. Most of the scripts required by each application are common. Accordingly, there is redundancy in today's multimedia system architectures as common scripts are located at each application server within the system.

Embodiments of the present invention permit, among other things, multimedia systems to more efficiently provide multimedia services by reducing the redundancy within the multimedia systems. In accordance with embodiments of the invention, a multimedia system architecture is provided that includes a script server. The script server stores or otherwise provides scripts that are commonly required by the various multimedia applications within the multimedia system. When an application server runs an application and determines that a media-related function is required from a media server, a script corresponding with the required media-related function is accessed from the script server. The script is then run to invoke the media-related function.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

IMS IP Multimedia Subsystem
IP Internet Protocol
LAN Local Area Network
WAN Wide Area Network As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring now to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the system 100 may include, among other components not shown, application servers 102, script server 104, and media servers 106. Each of the components of the system 100, including the application servers 102, script server 104, and media servers 106 may generally comprise any type of computing device. In some embodiments, the application servers 102, script server 104, and media servers 106 may be any type of application server, database server, or file server configurable to perform the methods described herein. In addition, each of the application servers 102, script server 104, and media servers 106 may be a dedicated or shared server. Internal components of the application servers 102, script servers 104, and media servers 106 may include, without limitation, a processing unit, internal system memory, and a suitable system bus for coupling various system components, including one or more databases for storing information (e.g., files and metadata associated therewith).

The components with the system 100 may communicate with each other via a network 108, which may include, without limitation, one or more local area networks (LANs) and/or wide area networks (WANs). Such networking environments are commonplace in offices, enterprise-wide computer networks, intranets, and the Internet. It should be understood that any number of application servers, script servers, and media servers may be employed within the system 100 within the scope of the present invention. Additionally, although many other components of the system 100 are not shown, those of ordinary skill in the art will appreciate that such components and their interconnections are well known. Accordingly, additional details concerning components not shown in the system 100 are not further disclosed herein.

Each application server 102 within the system 100 may host one or more types of multimedia services applications that each contain the logic for providing a specific type of multimedia service. For instance, one application server 102 may host a video conferencing application, another application server 102 may host a video sharing application, and another application server 102 may host a video game application. It should be understood by one skilled in the art that a wide variety of multimedia services applications may be provided by application servers 102 within the system 100 in accordance with various embodiments of the invention. Additionally, although three application servers 102 are shown within FIG. 1, it should be understood that the system 100 may include any number of application servers 102.

Generally, when a multimedia service is requested, an application server 102 hosting the type of multimedia service being requested is accessed. The application server 102 then runs the application logic necessary to provide the requested multimedia service. Often, multimedia services require one or more media-related functions to be performed. For instance, media-related functions that may be required for various multimedia services include media manipulation (e.g., video mixing), playing tones, providing announcements, transcoding, adding text to a video, and the like. Such media-related functions are provided by the media servers 106 within the system 100 of FIG. 1. Accordingly, when an application running on an application server 102 determines that a media-related function is required, a media server 106 is instructed to perform the media-related function. As such, the application server 102 generally acts as a controller instructing the media server 106 to perform a media-related function, and the media server 106 in turn acts as a processor to implement the media-related function. The media servers 106 may each provide one or more types of media-related functions for one or more media types (e.g., video, audio). In some cases, the system 100 may include multiple media severs 106 with similar functionality for fault tolerance purposes, while in other cases, the system 100 may include media servers 106 that are each capable of performing different media-related functions. Any and all such variations are contemplated to be within the scope of embodiments of the present invention. Additionally, although three application servers 102 are shown within FIG. 1, it should be understood that the system 100 may include any number of application servers 102.

As indicated previously, historically, scripts required to be run when a media-related function is needed are provided by each application server 106. However, the scripts are often common amongst the application servers 106 such that there is redundancy in the system. As contemplated by embodiments of the present invention, a script server 104 is included within the system 100 to provide common scripts for media-related functions. Instead of the application servers 106 each having to provide the required scripts, the commons scripts are consolidated into the script server 104. Accordingly, each application server 102 does not have to store or otherwise generate scripts when needed, thus saving on storage and/or processing requirements for the application servers 102. Although a single script server 104 is shown in FIG. 1, it should be understood by one skilled in the art that one or more devices may be employed to provided the functionality of the script server 104 as described herein.

As noted previously, in operation, when an application is being run by an application server 102 to provide a multimedia service, it may be determined that a media-related function should be performed by a media server 106. In accordance with embodiments of the invention, a script that corresponds with that media-related function is called from the script server 104, and the script is run to coordinate the media-related function. In some embodiments, the script server 104 includes a database of common scripts and also includes the capability to retrieve and run a script when requested. In other embodiments, the script server 104 may simply act as a database storing a variety of common scripts for the application servers 102. In such embodiments, the scripts may be retrieved from the script server 104 and run by another component (e.g., the media server). Any and all such variations are contemplated within the scope of embodiments of the present invention.

Figure 2:
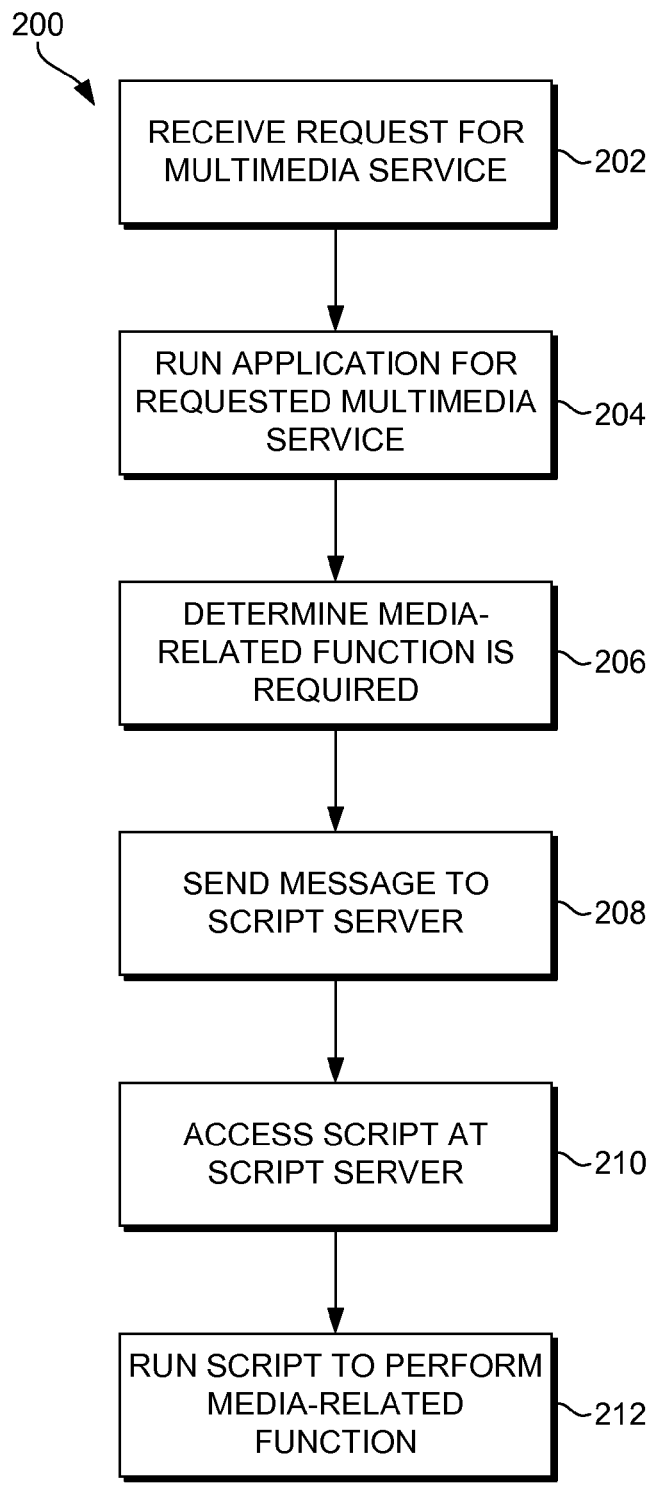
FIG. 2 is a flow diagram showing a method for providing a multimedia service from a multimedia system architecture in accordance with an embodiment of the present invention.

Referring now to FIG. 2, a flow diagram is provided illustrating a method 200 for providing a multimedia service from a multimedia system architecture in accordance with an embodiment of the present invention. Initially, as shown at block 202, a multimedia service is requested. As indicated previously, a wide variety of multimedia services may be requested in according with various embodiments of the invention, such as, for instance, video conferencing, video chat, and video games. In response to the request, an application server, such as an application server 102 of FIG. 1, which hosts the type of requested multimedia service, begins to run application logic to provide the multimedia service, as shown at block 204.

As shown at block 206, while the application logic is being run by the application server, it is determined that a media-related function is required to be performed by a media server, such as a media server 106 of FIG. 1. As indicated previously, a wide variety of media-related functions may be required by a multimedia application, such as, for instance, media manipulation (e.g., video mixing), playing tones, providing announcements, transcoding, adding text to a video, and the like.

The application server sends a message to a script server, such as the script server 104 of FIG. 1, as shown at block 208. In an embodiment, the message from the application server may indicate the script that needs to be invoked. In another embodiment, the message from the application server may indicate the media-related function that needs to be provided, and the script server determines the appropriate script for the requested media-related function.

In response to the message from the application server, the script server accesses the appropriate script from its storage, as shown at block 210. The script server then runs the script, as shown at block 212, to cause the media server to provide the media-related function requested by the application server. In an embodiment, running the script may cause a request/response mechanism to be performed in which signaling is passed back and forth between the script server and the media server while the scrip is being run.

Figure 3:
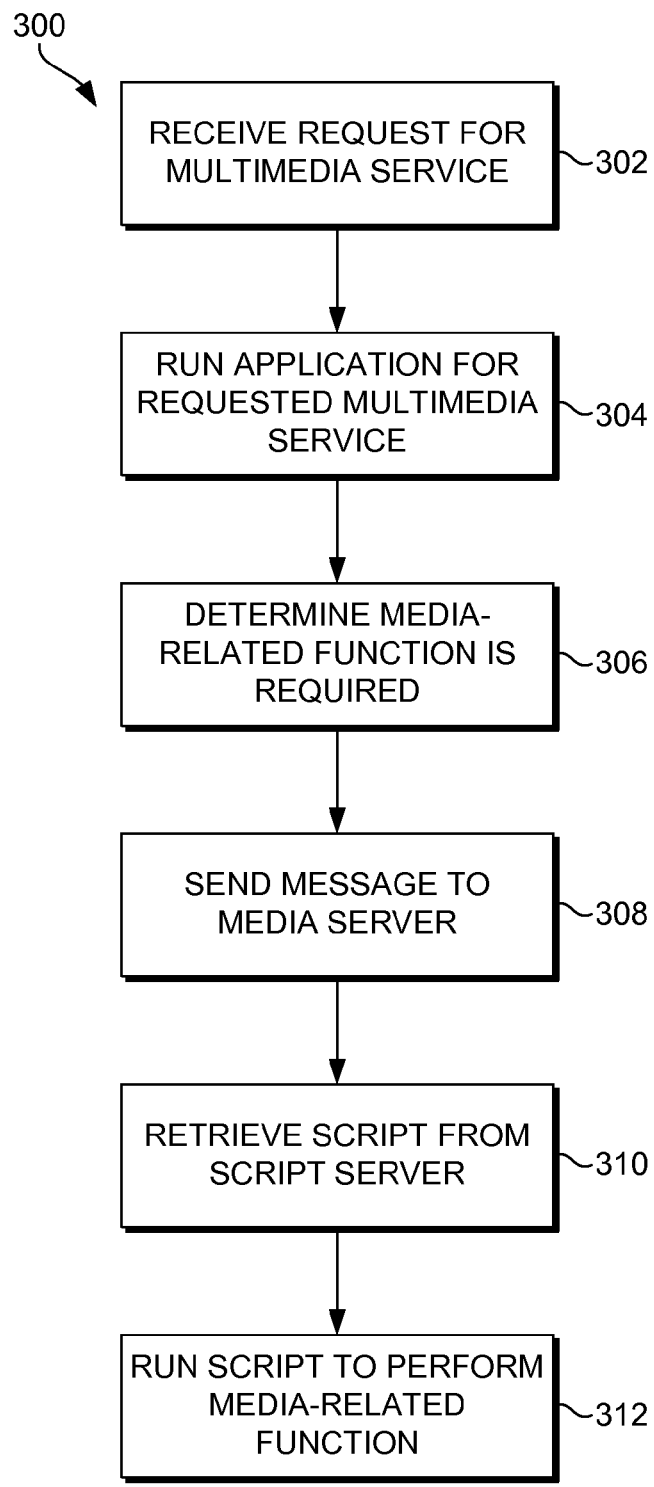
FIG. 3 is a flow diagram showing a method for providing a multimedia service from a multimedia system architecture in accordance with another embodiment of the present invention.

Turning to FIG. 3, a flow diagram is shown illustrating a method 300 for providing a multimedia service from a multimedia system architecture in accordance with another embodiment of the present invention. While in the method of FIG. 2, the script server includes both a database of scripts and the ability to invoke scripts when requested, in the embodiment of FIG. 3, the script server merely serves as a database of scripts and the media server includes the ability to retrieve and invoke a script. Initially, as shown at block 302, a type of multimedia service is requested. In response, an application server begins to run an application corresponding with the requested multimedia service, as shown at block 304. While running the application, a determination is made that a media-related function is required from a media server, as shown at block 306. Accordingly, a message is sent from the application server to a media server, at block 308. to request the media-related function. In some cases, the message may indicate a script to be invoked, while in other cases, the message may indicate the requested media-related function.

After receiving the message from the application server, the media server retrieves the appropriate script from the script server, as shown at block 310. The media server then runs the retrieved script to invoke the media-related function required by the multimedia application being run, as shown at block 312.

It should be understood by one skilled in the art that the methods 200 and 300 described with reference to FIGS. 2 and 3 herein are provided by way of illustration only. Accordingly, other methods for providing multimedia services using a script server that maintains common scripts for calling media-related functions may be employed within embodiments of the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media embodying computer-useable instructions for performing a method comprising:
    running a multimedia application at an application server within a multimedia system, the multimedia system including a plurality of application servers that operate to host and execute a plurality of different types of multimedia applications;
    determining, at the application server running the multimedia application, that a media-related function is needed from a media server within the multimedia system, the multimedia system including media servers that provide different types of media-related functions for the application servers;
    sending a message from the application server to the media server to request the media-related function;
    at the media server, in response to the message from the application server, retrieving from a script server within the multimedia system, a script corresponding with the media-related function, wherein the script server provides scripts that are commonly required by the different types of multimedia applications residing on the application servers to invoke the different types of media-related functions provided by the media servers;
    running the script; and
    performing the media-related function at the media server in accordance with the script.

2. The one or more computer-readable media of claim 1, wherein the multimedia application comprises a video media application.

3. The one or more computer-readable media of claim 1, wherein the multimedia application comprises at least one of: video conferencing, video sharing, video chat, and a video game.

4. The one or more computer-readable media of claim 1, wherein the media-related function comprises at least one of: media manipulation, video mixing, playing a tone, providing an announcement, transcoding, and adding text to a video.

5. The one or more computer-readable media of claim 1, wherein the message from the application server indicates the script to be run.

6. The one or more computer-readable media of claim 1, wherein the script is run by the media server.

7. A multimedia system for providing multimedia services, the multimedia system comprising:
    a plurality of application servers hosting and running a plurality of different types of multimedia applications, wherein at least a portion of the multimedia applications require a plurality of different types of media-related functions to be performed by one or more media servers, wherein when a multimedia application requires a media-related function to be performed by a media server, the application server sends a request to a script server;
    the one or more media servers that perform the plurality of different types of media-related functions for the at least a portion of the multimedia applications, wherein the media server performs the media-related function in response to a script that is run by the script server; and
    one or more script servers storing a plurality of scripts that are commonly required by the plurality of different types of multimedia applications to invoke the plurality of different types of media-related function performed by the one or more media servers, wherein when the script server receives the request from the application server, the script server retrieves a script from the stored plurality of scripts, and wherein the script server runs the script causing the media server to provide the media-related function requested by the application server.

8. The multimedia system of claim 7, wherein the multimedia applications comprise video media applications.

9. The multimedia system of claim 7, wherein the multimedia applications comprise at least one of: video conferencing, video sharing, video chat, and a video game.

10. The multimedia system of claim 7, wherein the media-related functions comprise at least one of: media manipulation, video mixing, playing a tone, providing an announcement, transcoding, and adding text to a video.

11. The multimedia system of claim 7, wherein the one or more script servers are configured to run scripts when media-functions are requested.

12. The multimedia system of claim 11, wherein the script server is configured to receive messages from the application servers and access scripts in response to the message.

13. The multimedia system of claim 12, wherein the messages from the application servers indicate the scripts to be run by the script server.

14. The multimedia system of claim 7, wherein the messages from the application servers indicate the media-related functions that need to be performed, and the script server determines the appropriate scripts for the media media-related function.

15. A script server within a multimedia system, the multimedia system for providing multimedia services and including a plurality of application servers providing a plurality of different types of multimedia applications, the script server comprising:
    a database of a plurality of scripts, each script for invoking one of a plurality of media-related functions, wherein a script is employed by at least two multimedia applications to invoke a particular media-related function, wherein the at least two multimedia applications that employ the script reside on separate application servers;
    at least one processor; and
    one or more computer-readable media embodying instructions for:
    receiving a message from an application server running a multimedia application and requiring a media-related function,
    in response to the message, accessing a script corresponding with the media-related function, and
    running the script to cause a media server to provide the media-related function.

16. The script server of claim 15, wherein the multimedia application comprises a video media application.

17. The script server of claim 15, wherein the multimedia application comprises at least one of: video conferencing, video sharing, video chat, and a video game.

18. The script server of claim 15, wherein the media-related functions comprise at least one of: media manipulation, video mixing, playing a tone, providing an announcement, transcoding, and adding text to a video.

* * * * *